(12) United States Patent
Nakazawa et al.

(10) Patent No.: US 6,326,712 B1
(45) Date of Patent: Dec. 4, 2001

(54) MAGNETIC BEARING DEVICE

(75) Inventors: Toshiharu Nakazawa, Chigasaki; Toshimitsu Barada, Tokyo; Atsushi Ooyama, Fujisawa; Masafumi Inoue, Tokyo; Shinichi Sekiguchi, Yokohama; Hiroyuki Shinozaki, Fujisawa, all of (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/643,950

(22) Filed: Aug. 23, 2000

(30) Foreign Application Priority Data

Aug. 25, 1999 (JP) .................................................. 11-238193
Dec. 22, 1999 (JP) .................................................. 11-364043

(51) Int. Cl.⁷ .................................................. F16C 32/04
(52) U.S. Cl. .................................. 310/90.5; 324/207.12; 324/207.26; 310/68 B
(58) Field of Search ........................ 324/207.12, 207.26, 324/225; 310/90.5, 68 B (56) References Cited

U.S. PATENT DOCUMENTS

| | | | |
|---|---|---|---|
| 4,727,270 | * | 2/1988 | Payne ................................ 324/207.12 |
| 5,107,210 | | 4/1992 | Shirao et al. ...................... 324/207.12 |
| 5,302,894 | * | 4/1994 | Hrubes ............................... 324/207.12 |

FOREIGN PATENT DOCUMENTS

| | | |
|---|---|---|
| 2-202-439 | 10/1998 | (CA) . |
| 55-063008 | 5/1980 | (JP) . |
| 59-103019 | 6/1984 | (JP) . |
| 61-66540 | 4/1986 | (JP) . |
| 3-202702 | 9/1991 | (JP) . |
| 5-118329 | 5/1993 | (JP) . |
| 6-088591 | 3/1994 | (JP) . |
| 6-088592 | 3/1994 | (JP) . |
| 9-137826 | 5/1997 | (JP) . |
| 11-166537 | 6/1999 | (JP) . |

* cited by examiner

Primary Examiner—Burton S. Mullins
(74) Attorney, Agent, or Firm—Armstrong, Westerman, Hattori, McLeland & Naughton, LLP (57) ABSTRACT

A magnetic bearing device has an electromagnet for levitating an object under electromagnetic forces, a displacement sensor for detecting the displacement of the levitated object, a controller for supplying a signal to the displacement sensor through a cable and a current to the electromagnet through a cable, and a protective plate of nonmagnetic metal material disposed between the displacement sensor and the levitated object. The controller includes a levitation control system having a noise removing filter for preventing an abnormal signal caused by the protective plate from being applied to the displacement sensor.

19 Claims, 8 Drawing Sheets

MAGNETIC BEARING DEVICE

BACKGROUND OF THE INVENTION

1. Field of the Invention

The present invention relates to a magnetic bearing device for levitating and supporting an object under electromagnetic forces generated by an electromagnet.

2. Description of the Related Art

Displacement sensors for detecting the displacement of an object levitated by a magnetic bearing device include an eddy-current sensor, an inductive sensor, an electrostatic capacitive sensor, and an optoelectronic sensor such as a laser sensor. Of these displacement sensors, the eddy-current sensor and the inductive sensor are mainly used in turbo-molecular pumps.

For use in corrosive environments, magnetic bearings and displacement sensors need to be covered with a protective material. Magnetic bearing devices which employ eddy-current sensors, inductive sensors, and electrostatic capacitive sensors can be covered with a protective material which may be synthetic resin such as Teflon or ceramics. Optoelectronic sensors such as laser sensors are required to be covered with glass which allows a laser beam to pass therethrough. Eddy-current sensors, electrostatic capacitive sensors, and optoelectronic sensors cannot be used in situations where displacement sensors need to be covered with a metal material. Inductive sensors can be used if they are to be covered with a nonmagnetic metal.

Protecting magnetic bearings and displacement sensors with Teflon, ceramics, glass, etc. poses problems in terms of fabrication process, cost, and mechanical strength. In addition, these protective materials may not be used in special environments where gas contamination is problematic.

It is customary to employ inductive sensors protected by a nonmagnetic metal in such applications. However, the carrier frequency of an inductive sensor produces a magnetic field that generates an eddy current on the surface of a nonmagnetic metal partition, resulting in a reduction in the sensitivity of a detected signal from the inductive sensor, i.e., a reduction in the s/n ratio thereof.

A magnetic bearing operates by passing a current through an electromagnet and levitating an object under electromagnetic forces generated by the electromagnet. If the magnetic bearing and an inductive sensor combined therewith are covered with a nonmagnetic metal, then since both the magnetic bearing and the inductive sensor are covered with one nonmagnetic metal partition, electromagnetic noise generated by the electromagnet and an eddy current produced on the surface of the nonmagnetic metal partition by the electromagnetic noise pass through the nonmagnetic metal partition, adversely affecting the inductive sensor. The nonmagnetic metal partition that protects the inductive sensor and the magnetic bearing is thus disadvantageous in that it makes magnetic levitation control difficult due to magnetic and electric noise applied to the inductive sensor.

Figure 1:
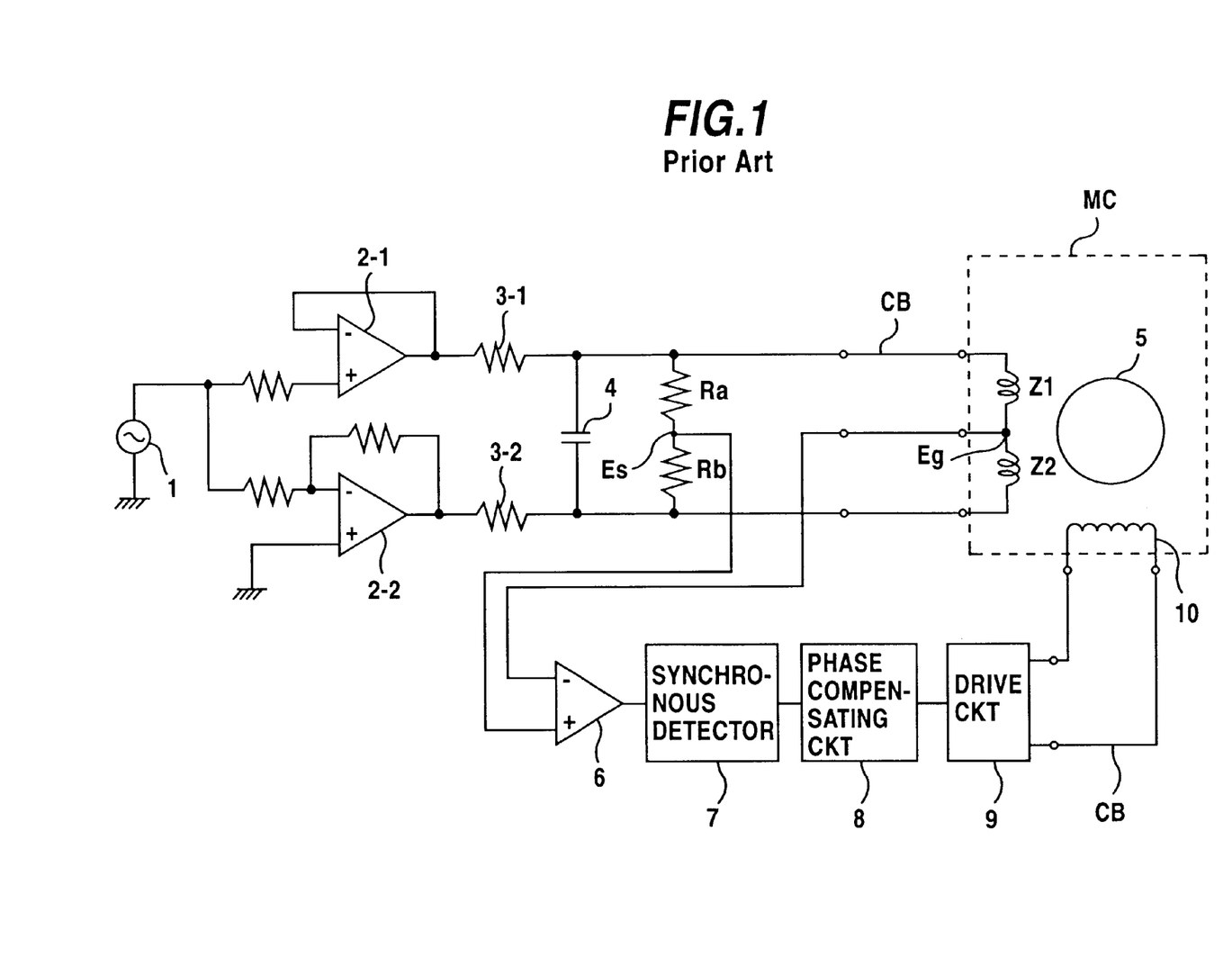
FIG. 1 is a circuit diagram, partly in block form, of a circuit arrangement of a control circuit for a conventional magnetic bearing device.

FIG. 1 of the accompanying drawings shows a circuit arrangement of a control circuit for a conventional magnetic bearing device. As shown in FIG. 1, the control circuit includes an oscillator 1 whose output signal is supplied via operational amplifiers 2-1, 2-2, current-limiting resistors 3-1, 3-2, and a cable CB to a pair of series-connected displacement sensors Z1, Z2 which detect the displacement, in an X-axis direction, for example, of an object 5 levitated by a magnetic bearing MC. A potential (sensor signal) Eg at the junction between the displacement sensors Z1, Z2 is applied to a negative terminal of a differential amplifier 6, and a reference potential Es that is set up by reference resistors Ra, Rb is applied to a positive terminal of the differential amplifier 6. The differential amplifier 6 applies an output signal via a synchronous detector 7 and a phase compensating circuit 8 to a drive circuit 9.

Figure 2:
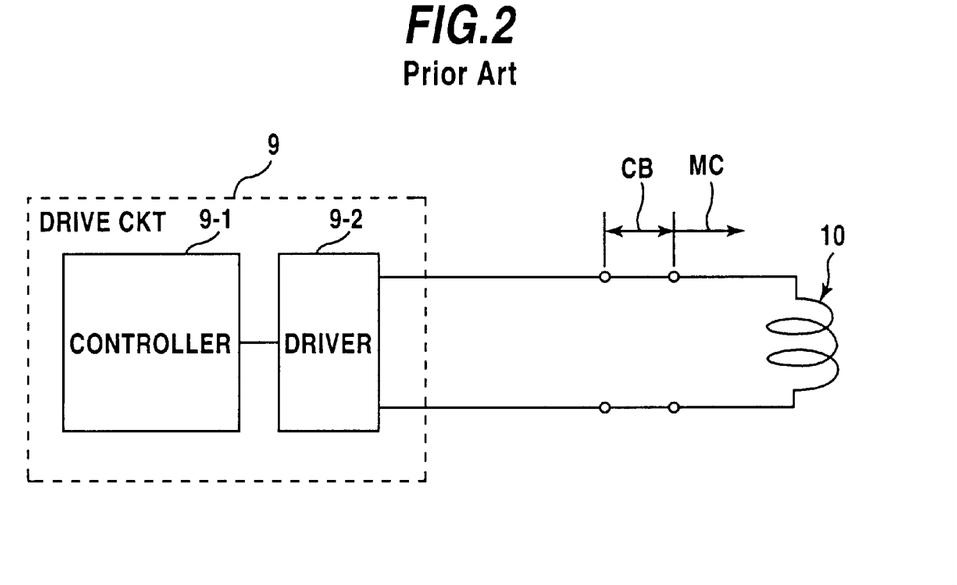
FIG. 2 is a block diagram of a drive circuit of the control circuit shown in FIG. 1.

As shown in FIG. 2 of the accompanying drawings, the drive circuit 9 comprises a controller 9-1 and a driver 9-2. The controller 9-1 controls the driver 9-2 according to a PWM process. The driver 9-2 supplies an output signal to an electromagnet coil 10 of the magnetic bearing MC.

In FIG. 1, a capacitor 4 is connected parallel to the displacement sensors Z1, Z2 to cause parallel resonance therewith.

If a protective plate of nonmagnetic metal is disposed between the displacement sensors Z1, Z2 and the object 5 and each of the displacement sensors Z1, Z2 comprises an inductive sensor, then the above problems arise, i.e., an eddy current generated by the protective plate of nonmagnetic metal causes a reduction in the sensitivity of a detected signal from the displacement sensors Z1, Z2, and the displacement sensors Z1, Z2 are adversely affected by a magnetic field generated by a current that is supplied to energize the electromagnet coil 10.

SUMMARY OF THE INVENTION

It is therefore an object of the present invention to provide a magnetic bearing device which includes a magnetic bearing and a displacement sensor, at least the displacement sensor being protected by a nonmagnetic metal material, and which is capable of performing accurate levitation control without reducing the sensitivity of a detected signal from the displacement sensor, i.e., without reducing the s/n ratio thereof, with an eddy current generated by the nonmagnetic metal material, and also without allowing the displacement sensor to be adversely affected by a magnetic field produced by a current that is supplied to energize an electromagnet coil of the magnetic bearing.

According to the present invention, there is provided a magnetic bearing device comprising an electromagnet for levitating an object under electromagnetic forces, an inductive displacement sensor for detecting the displacement of the levitated object, a controller for supplying a signal to the displacement sensor through a cable and a current to the electromagnet through a cable, and a protective plate of nonmagnetic metal material disposed between the displacement sensor and the levitated object, the controller including a levitation control system having a noise removing filter for preventing an abnormal signal caused by the protective plate from being applied to the displacement sensor.

Since the controller includes the levitation control system having the noise removing filter for preventing an abnormal signal caused by the protective plate from being applied to the displacement sensor, the s/n ratio of a sensor signal of the displacement sensor is increased and the displacement sensor functions sufficiently even though the displacement sensor is of the inductive type and the protective plate of nonmagnetic metal material is disposed between the displacement sensor and the levitated object.

The noise removing filter may comprise either a filter or a filter and a phase compensator.

The displacement sensor may include a yoke extending through the protective plate, or the displacement sensor may include a yoke, and the magnetic bearing device may further comprise a magnetic member of a material which is identical or similar to the material of the yoke, the magnetic member being embedded in the protective plate adjacent to the yoke.

With the above arrangement, the distance between the yoke and the levitated object is reduced by the thickness of the protective plate, resulting in an increase in the sensitivity of the displacement sensor for detecting the displacement of the levitated object with high accuracy.

The controller may include a power driver for energizing a sensor element of the displacement sensor. The power driver is effective in increasing the rate of change of a detected signal of the displacement sensor with respect to a change in the displacement of the levitated object.

The controller may include a PWM driver for energizing the electromagnet and a common-mode coil, a normal-mode coil, or a common-mode coil and a normal-mode coil connected to an output terminal of the PWM driver.

The PWM driver and the common-mode coil, the normal-mode coil, or the common-mode coil and the normal-mode coil are effective to reduce electromagnetic noise generated by the electromagnet.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 3:
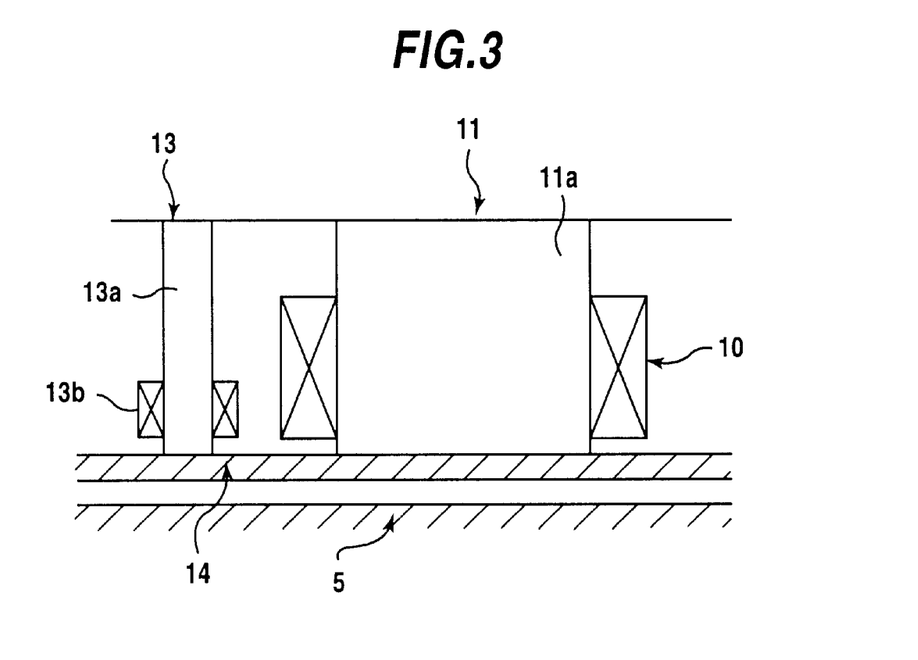
FIG. 3 is a cross-sectional view of a displacement sensor and an electromagnet of a magnetic bearing device according to the present invention.

As shown in FIG. 3, a magnetic bearing device according to the present invention includes a protective plate (can) 14 of nonmagnetic metal material that is disposed between a levitated object 5, and an electromagnet 11 which supports the object 5 and an inductive displacement sensor 13 for detecting the displacement of the levitated object 5. The protective plate 14 of nonmagnetic metal material serves to protect the electromagnet 11 and the displacement sensor 13. The displacement sensor 13 comprises a sensor yoke (sensor core) 13a and a sensor coil 13b disposed around the sensor yoke 13a. The electromagnet 11 comprises an electromagnet yoke 11a and an electromagnet coil 10 disposed around the electromagnet yoke 11a.

Figure 4:
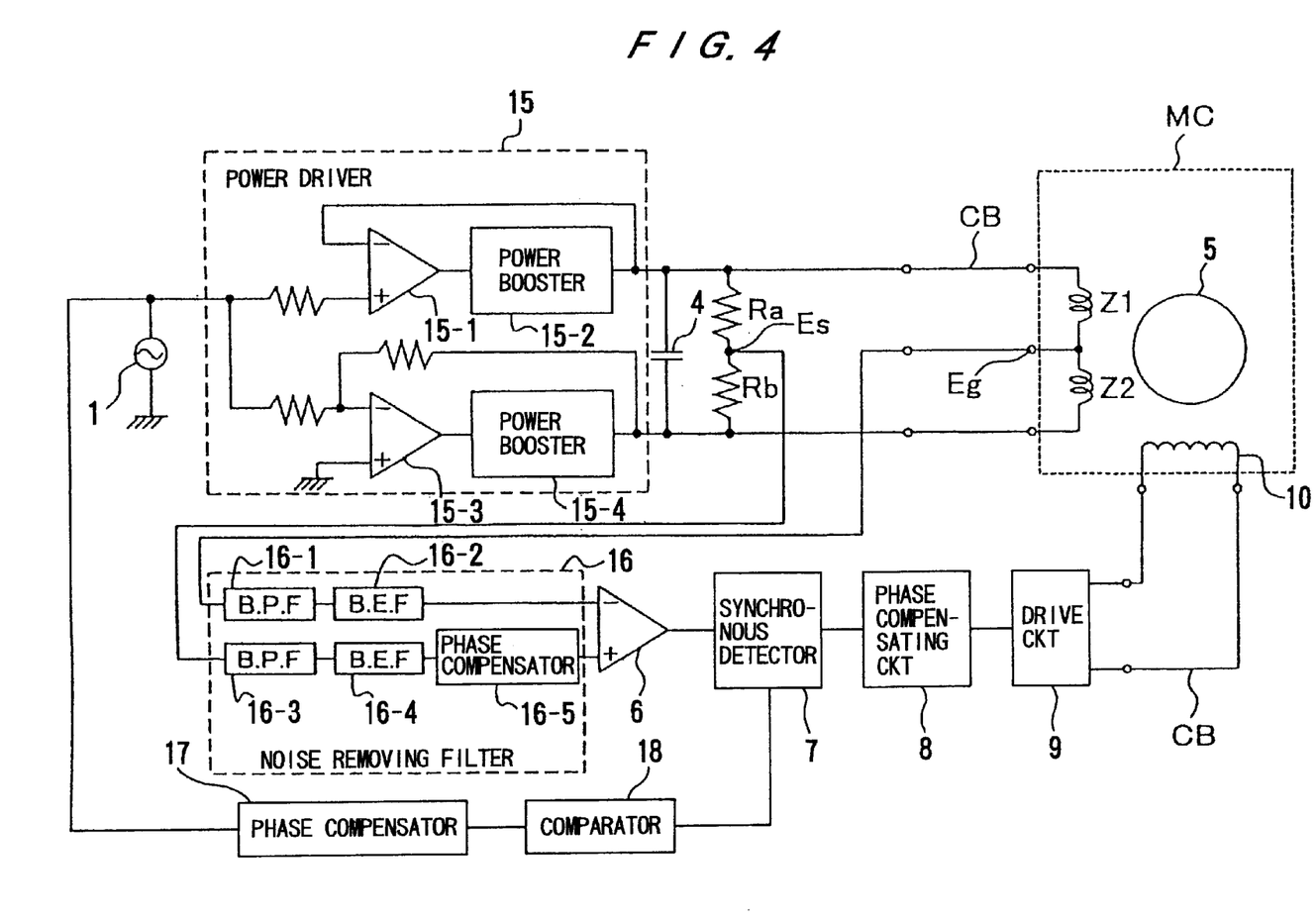
FIG. 4 is a circuit diagram, partly in block form, of a circuit arrangement of a levitation control system of the magnetic bearing device according to the present invention.

FIG. 4 shows a circuit arrangement of a levitation control system of the magnetic bearing device according to the present invention. As shown in FIG. 4, the levitation control system includes an oscillator 1 whose output signal is supplied via operational amplifiers 15-1, 15-3, power boosters 15-2, 15-4, and a cable CB to a pair of series-connected displacement sensors Z1, Z2 which detect the displacement of an object 5 levitated by a magnetic bearing MC. The amplifiers 15-1, 15-3 and the power boosters 15-2, 15-4 jointly make up a power driver 15. A potential (sensor signal) Eg at the junction between the displacement sensors Z1, Z2 is applied to a negative terminal of a differential amplifier 6 via a bandpass filter 16-1 and a band eliminating filter 16-2 of a noise removing filter 16. A reference potential (reference signal) Es that is set up by reference resistors Ra, Rb is applied to a positive terminal of the differential amplifier 6 via a bandpass filter 16-3, a band eliminating filter 16-4, and a phase compensator 16-5 of the noise removing filter 16. The differential amplifier 6 applies an output signal via a synchronous detector 7 and a phase compensating circuit 8 to a drive circuit 9.

Figure 5:
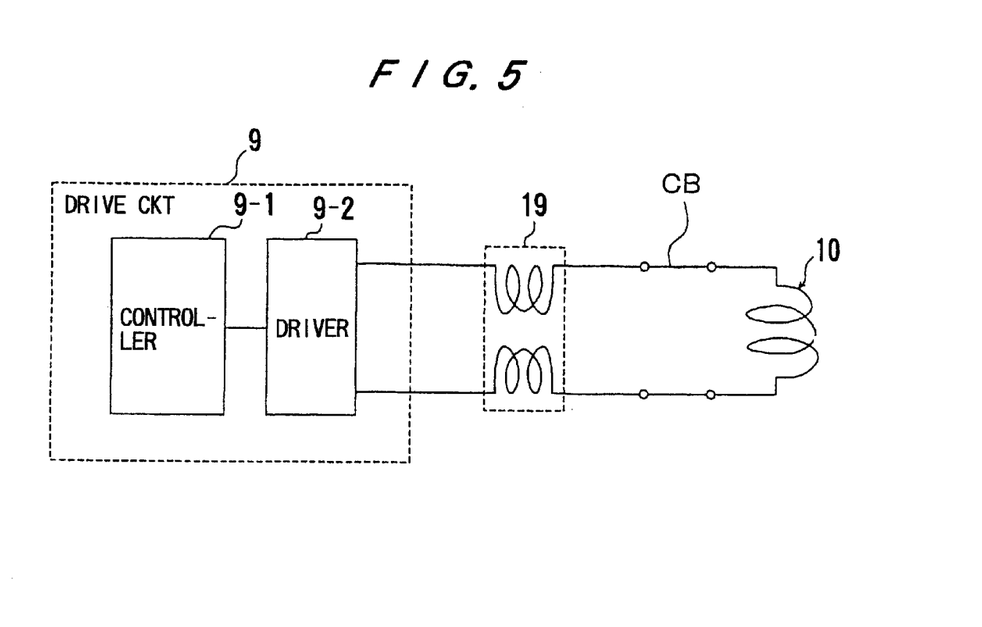
FIG. 5 is a block diagram of a drive circuit of the levitation control system of the magnetic bearing device according to the present invention.

As shown in FIG. 5, the drive circuit 9 comprises a controller 9-1 and a driver 9-2. The driver 9-2 supplies an output signal through a cable CB to the coil 10 of the electromagnet 11. The oscillator 1 applies its output signal via a phase compensator 17 and a comparator 18 to the synchronous detector 7.

Because the protective plate (can) 14 of nonmagnetic metal material is disposed between the levitated object 5, and the electromagnet 11 and the displacement sensor 13, the s/n ratio of the sensor signal of the displacement sensor 13 is lowered because of a loss due to an eddy current generated by the protective plate 14 and also due to a magnetic field generated by the electromagnet 11. In order to improve the s/n ratio of the sensor signal, the power driver 15 is employed in a current supply for driving the displacement sensor 13, i.e., the displacement sensors Z1, Z2. In addition, the noise eliminating filter 16 which includes the bandpass filter 16-1, the band eliminating filter 16-2, the bandpass filter 16-3, the band eliminating filter 16-4, and the phase compensator 16-5 is employed in order to sufficiently remove noise from the sensor signal Eg and the reference signal Es. With this arrangement, the effect of the magnetic field generated by the current supplied to energize the electromagnet 11 on the sensor current Eg is reduced to allow stable levitation control over the object 5.

Since the sensor signal Eg passes through the bandpass filter 16-1 and the band eliminating filter 16-2, and the reference signal Es passes through the bandpass filter 16-3 and the band eliminating filter 16-4, the sensor signal Eg and the reference signal Es are shifted out of phase with each other. In order to compensate for such a phase shift, the phase compensator 16-5 is added to the path of the reference signal Es. The phase compensator 16-5 may instead be added to the path of the sensor signal Eg. The output signal from the oscillator 1 is phase-compensated by the phase compensator 17 before it is supplied to the synchronous detector 7. By thus performing phase compensation, the sensitivity of the displacement sensor 13, i.e., the displacement sensors Z1, Z2, is optimized.

In the drive circuit 9, the controller 9-1 controls the driver 9-2 according to a PWM process. The output of the driver 9-2 is supplied via a common-mode coil 19 to the coil 10 of the electromagnet 11 for thereby reducing switching noise in the PWM process to reduce its effect on the displacement sensor 13.

Figure 6:
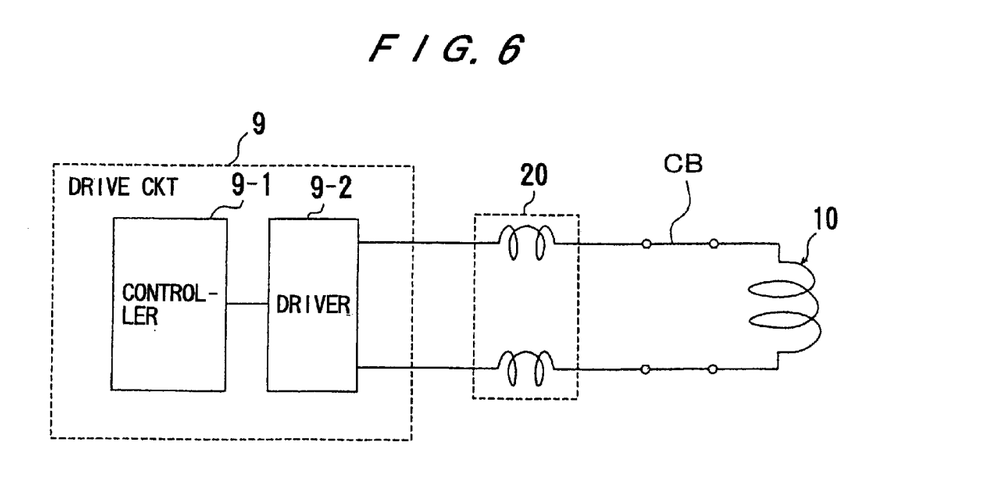
FIG. 6 is a block diagram of a modified drive circuit.

As shown in FIG. 6, the output signal from the drive circuit 9 may be supplied via a normal-mode coil 20 to the coil 10 of the electromagnet 11 for thereby reducing transient changes of the current in the PWM process to reduce noise due to such transient changes of the current and hence to reduce their effect on the displacement sensor 13.

Figure 7:
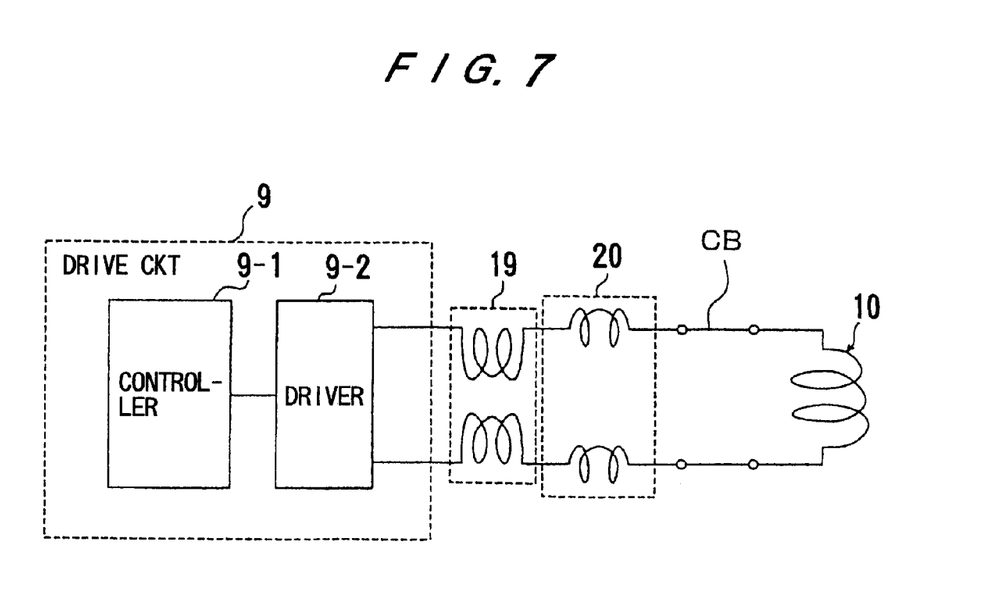
FIG. 7 is a block diagram of another modified drive circuit.

Alternatively, as shown in FIG. 7, the output signal from the drive circuit 9 may be supplied via the common-mode coil 19 and the normal-mode coil 20 to the coil 10 of the electromagnet 11 for thereby reducing noise in the PWM process to reduce its effect on the displacement sensor 13.

The magnetic bearing device needs to have a can structure in which the displacement sensor and the electromagnet are protected by a protective plate or can, especially if the magnetic bearing device is combined with an excimer laser, for example, which is used in a corrosive environment and subject to organic or Si gas contamination. The protective plate or can is made of a nonmagnetic metal material such as SUS 304 or SUS 306 for protecting the displacement sensor and the electromagnet against corrosion and gas contamination. The displacement sensor, which comprises an inductive sensor, thus protected can function sufficiently when combined with the levitation control system shown in FIGS. 4 through 7.

Figure 8A:
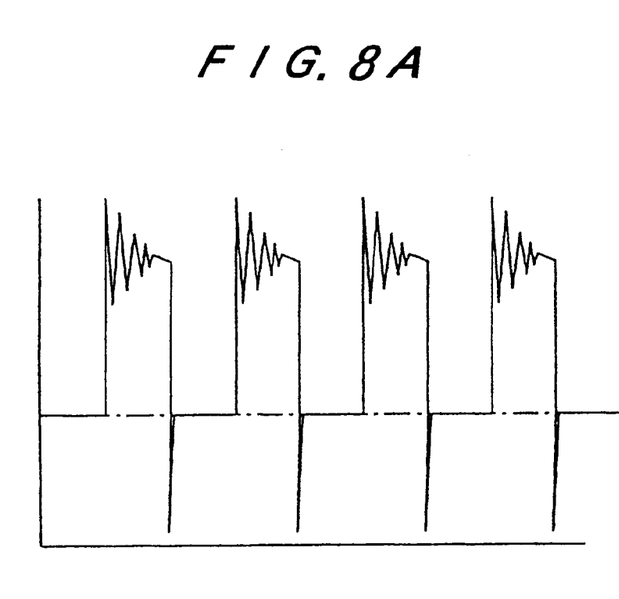
FIG. 8A is a diagram showing the waveform of a voltage applied to an electromagnet coil of a conventional magnetic bearing device.
Figure 8B:
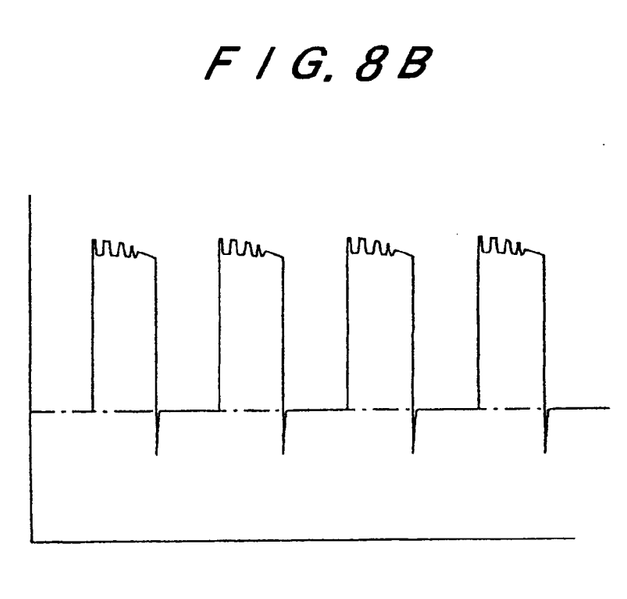
FIG. 8B is a diagram showing the waveform of a voltage applied to an electromagnet coil of the magnetic bearing device according to the present invention.

FIG. 8A shows the waveform of a voltage applied to the electromagnet coil of a conventional magnetic bearing device, and FIG. 8B is a diagram showing the waveform of a voltage applied to the electromagnet coil of the magnetic bearing device according to the present invention. A study of FIGS. 8A and 8B indicates that the voltage applied to the electromagnet coil of the magnetic bearing device according to the present invention suffers much less noise than the voltage applied to the electromagnet coil of the conventional magnetic bearing device.

Figure 9A:
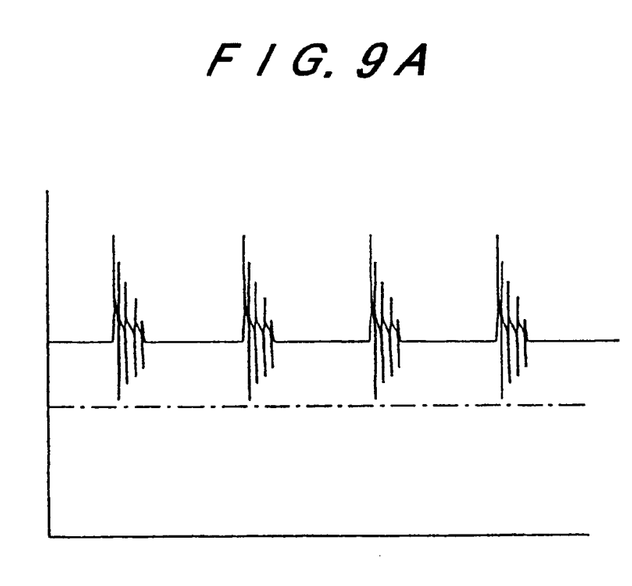
FIG. 9A is a diagram showing the waveform of a sensor signal of the conventional magnetic bearing device.
Figure 9B:
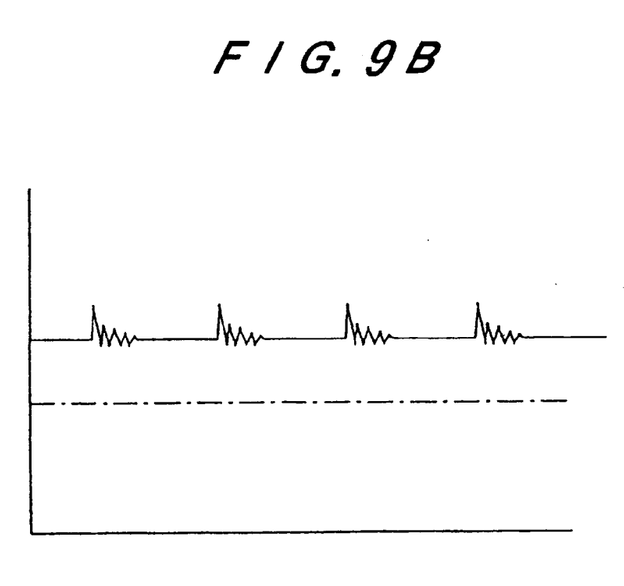
FIG. 9B is a diagram showing the waveform of a sensor signal of the magnetic bearing device according to the present invention.

FIG. 9A shows the waveform of a sensor signal of the conventional magnetic bearing device, and FIG. 9B shows the waveform of a sensor signal of the magnetic bearing device according to the present invention. It can be seen from FIGS. 9A and 9B that the sensor signal of the magnetic bearing device according to the present invention contains much less electromagnetic noise from the electromagnet than the sensor signal of the conventional magnetic bearing device.

Figure 10A:
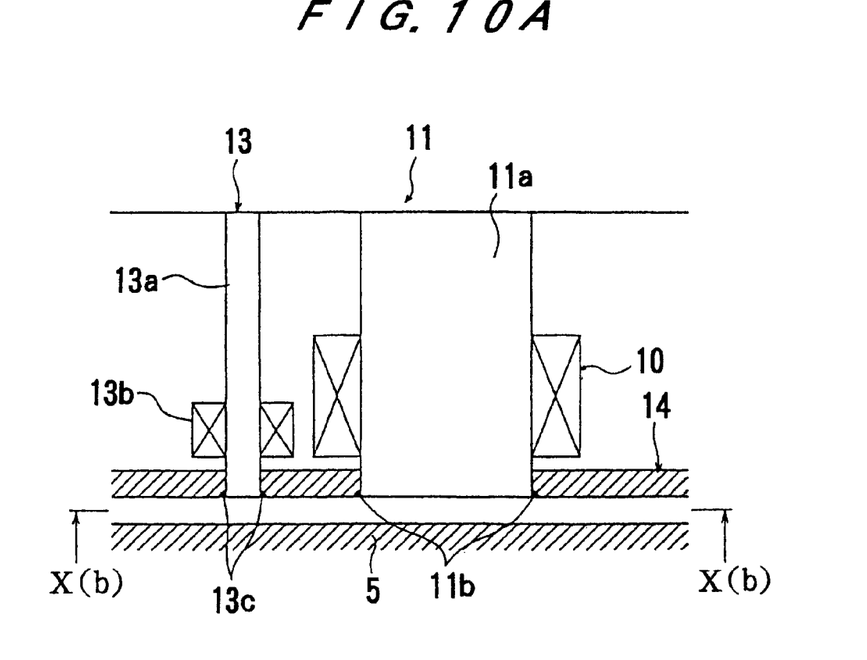
FIG. 10A is a cross-sectional view of a displacement sensor and an electromagnet of another magnetic bearing device according to the present invention.
Figure 10B:
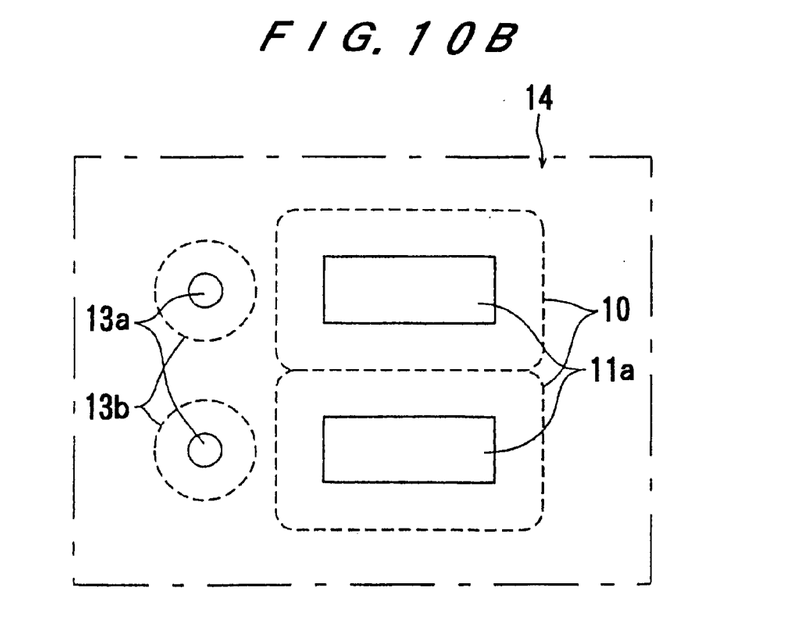
FIG. 10B is a view taken along line X(b)—X(b) of FIG. 10A.

FIGS. 10A and 10B show a displacement sensor and an electromagnet of another magnetic bearing device according to the present invention. As shown in FIGS. 10A and 10B, a displacement sensor 13 has a sensor yoke (sensor core) 13a having an end extending through a protective plate 14 of nonmagnetic metal material and facing a levitated object 5. An electromagnet 11 has an electromagnet yoke (electromagnet core) 11a having an end extending through the protective plate 14 of nonmagnetic metal material and facing the levitated object 5. The ends of the sensor yoke 13a and the electromagnet yoke 11a which extend through the protective plate 14 are welded to the protective plates 14 by respective joint seals 13c, 11b.

Since the end of the sensor yoke 13a extends through the protective plate 14, the distance between the levitated object 5 and the sensor yoke 13a is reduced by the thickness of the protective plate 14. Therefore, the sensitivity of the displacement sensor 13 is increased for detecting the displacement of the levitated object 5 with high accuracy. Furthermore, because the end of the electromagnet yoke 11a also extends through the protective plate 14, the distance between the levitated object 5 and the electromagnet yoke 11a is also reduced by the thickness of the protective plate 14. Consequently, the electromagnet 11 can apply increased magnetic forces to the levitated object 5, and hence can be reduced in size.

In the embodiment shown in FIGS. 10A and 10B, the ends of the sensor yoke 13a and the electromagnet yoke 11a extend through the protective plate 14 and face the levitated object 5. However, rather than having the ends of the sensor yoke 13a and the electromagnet yoke 11a extending through the protective plate 14, magnetic members whose material is identical or similar to the sensor yoke 13a and the electromagnet yoke 11a may be embedded in the protective plate 14 adjacent to the sensor yoke 13a and the electromagnet yoke 11a.

If the magnetic bearing device according to the present invention is used in a corrosive environment, then sensor yoke 13a and the electromagnet yoke 11a may be made of a magnetic material resistant to the corrosive environment.

Although certain preferred embodiments of the present invention have been shown and described in detail, it should be understood that various changes and modifications may be made therein without departing from the scope of the appended claims.

What is claimed is:

1. A magnetic bearing device comprising:
   an electromagnet for levitating an object under electromagnetic forces;
   an inductive displacement sensor for detecting the displacement of the levitated object;
   a controller for supplying a signal to said displacement sensor through a cable and a current to said electromagnet through a cable; and
   a protective plate of nonmagnetic metal material disposed between said displacement sensor and said levitated object,
   wherein said controller includes a levitation control system having a noise removing filter for preventing an abnormal signal caused by said protective plate from being applied to said displacement sensor, and
   wherein said displacement sensor includes a yoke extending through said protective plate.

2. A magnetic bearing device according to claim 1, wherein said controller includes a power driver for energizing a sensor element of said displacement sensor.

3. A magnetic bearing device according to claim 1, wherein said controller includes a PWM driver for energizing said electromagnet and a common-mode coil connected to an output terminal of said PWM driver.

4. A magnetic bearing device according to claim 1, wherein said controller includes a PWM driver for energizing said electromagnet and a normal-mode coil connected to an output terminal of said PWM driver.

5. A magnetic bearing device according to claim 1, wherein said controller includes a PWM driver for energizing said electromagnet and a common-mode coil and a normal-mode coil which are connected to an output terminal of said PWM driver.

6. A magnetic bearing device comprising:

an electromagnet for levitating an object under electromagnetic forces;

an inductive displacement sensor for detecting the displacement of the levitated object;

a controller for supplying a signal to said displacement sensor through a cable and a current to said electromagnet through a cable; and a protective plate mainly of nonmagnetic metal material disposed between said displacement sensor and said levitated object, wherein said controller includes a levitation control system having a noise removing filter for preventing an abnormal signal caused by said protective plate from being applied to said displacement sensor, and wherein said displacement sensor includes a yoke, said protective plate comprising a magnetic material portion which is of identical or similar material of said yoke, said magnetic material portion being embedded in said protective plate adjacent to said yoke.

7. A magnetic bearing device according to claim 6, wherein said controller includes a power driver for energizing a sensor element of said displacement sensor.

8. A magnetic bearing device according to claim 6, wherein said controller includes a PWM driver for energizing said electromagnet and a common-mode coil connected to an output terminal of said PWM driver.

9. A magnetic bearing device according to claim 6, wherein said controller includes a PWM driver for energizing said electromagnet and a normal-mode coil connected to an output terminal of said PWM driver.

10. A magnetic bearing device according to claim 6, wherein said controller includes a PWM driver for energizing said electromagnet and a common-mode coil and a normal-mode coil which are connected to an output terminal of said PWM driver.

11. A magnetic bearing device comprising:

an electromagnet for levitating an object under electromagnetic forces;

an inductive displacement sensor for detecting the displacement of the levitated object;

a controller for supplying a signal to said displacement sensor through a cable and a current to said electromagnet through a cable; and a protective plate of nonmagnetic metal material disposed between said displacement sensor and said levitated object, wherein said controller includes a levitation control system having a noise removing filter for preventing an abnormal signal caused by said protective plate from being applied to said displacement sensor, and wherein said controller includes a PWM driver for energizing said electromagnet and a common-mode coil connected to an output terminal of said PWM driver.

12. A magnetic bearing device according to claim 11, wherein said noise removing filter comprises either a filter or a filter and a phase compensator.

13. A magnetic bearing device according to claim 11, wherein said controller includes a power driver for energizing a sensor element of said displacement sensor.

14. A magnetic bearing device comprising:

an electromagnet for levitating an object under electromagnetic forces;

an inductive displacement sensor for detecting the displacement of the levitated object;

a controller for supplying a signal to said displacement sensor through a cable and a current to said electromagnet through a cable; and a protective plate of nonmagnetic metal material disposed between said displacement sensor and said levitated object, wherein said controller includes a levitation control system having a noise removing filter for preventing an abnormal signal caused by said protective plate from being applied to said displacement sensor, and wherein said controller includes a PWM driver for energizing said electromagnet and a normal-mode coil connected to an output terminal of said PWM driver.

15. A magnetic bearing device according to claim 14, wherein said noise removing filter comprises either a filter or a filter and a phase compensator.

16. A magnetic bearing device according to claim 14, wherein said controller includes a power driver for energizing a sensor element of said displacement sensor.

17. A magnetic bearing device comprising:

an electromagnet for levitating an object under electromagnetic forces;

an inductive displacement sensor for detecting the displacement of the levitated object;

a controller for supplying a signal to said displacement sensor through a cable and a current to said electromagnet through a cable; and a protective plate of nonmagnetic metal material disposed between said displacement sensor and said levitated object, wherein said controller including a levitation control system having a noise removing filter for preventing an abnormal signal caused by said protective plate from being applied to said displacement sensor, and wherein said controller includes a PWM driver for energizing said electromagnet and a common-mode coil and a normal-mode coil which are connected to an output terminal of said PWM driver.

18. A magnetic bearing device according to claim 17, wherein said noise removing filter comprises either a filter or a filter and a phase compensator.

19. A magnetic bearing device according to claim 17, wherein said controller includes a power driver for energizing a sensor element of said displacement sensor.

* * * * *